June 12, 1951 — J. W. ROACH — 2,556,446
ROTARY STUBBLE PULVERIZER

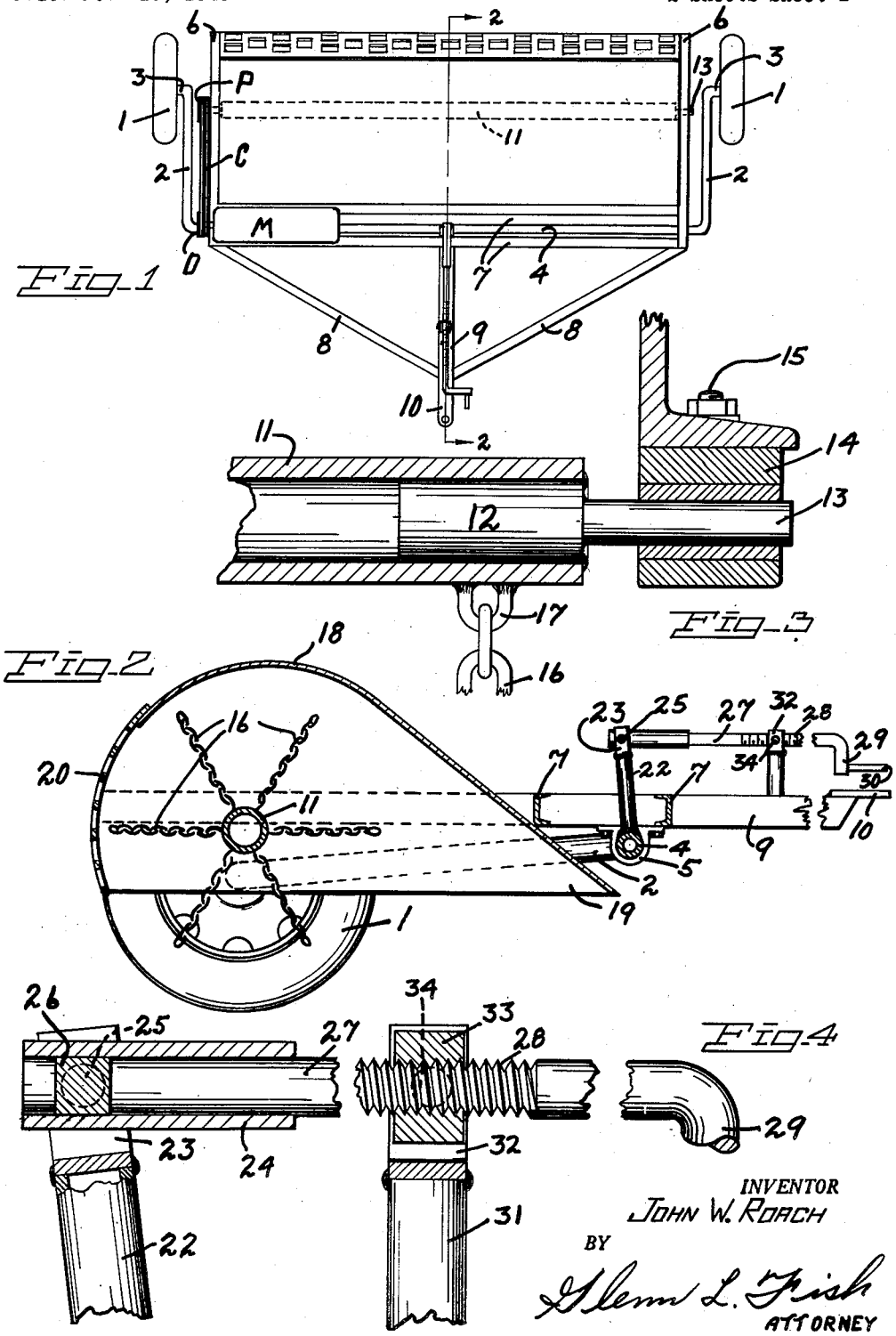

Filed Nov. 18, 1946 — 2 Sheets-Sheet 2

INVENTOR.
JOHN W. ROACH
BY
Glenn L. Fish
ATTORNEY

Patented June 12, 1951

2,556,446

UNITED STATES PATENT OFFICE 2,556,446

ROTARY STUBBLE PULVERIZER

John W. Roach, Genesee, Idaho

Application November 18, 1946, Serial No. 710,520

2 Claims. (Cl. 55—118)

The present invention relates generally to agricultural implements or soil cultivators of the wheeled implement type, and more specifically to a rotary stubble pulverizer that may be propelled by an automotive vehicle or horse drawn, and which is equipped with a motor operated rotary pulverizer including chains for beating down, breaking and pulverizing stubble remaining in a field after a harvester or header has removed the grain from the field.

After the harvest, the remaining stubble is so thick as to interfere with necessary plowing operations, and the primary object of the invention is the provision of means whereby the standing stubble may be beaten and broken into small particles and pulverized, and then spread upon the field to be plowed under in subsequent plowing operations.

In carrying out my invention I utilize a two-wheel implement or vehicle having a transversely arranged rotary drum carrying flexible beaters, and equipped with a suitable opeating motor; and the invention consists in certain novel features of construction and combinations and arrangements of parts as will hereinafter be more fully described and specifically set forth in the appended claims.

In the accompanying drawings I have illustrated one complete example of a physical embodiment of my invention in which the implement is adapted to be drawn by a tractor or other automotive vehicle across a stubble field, and in which the parts of the implement are combined and arranged in accord with one mode I have devised for the practical application of the principles of the invention. It will, however, be understood that changes and alterations are contemplated and may be made in these exemplifying drawings and mechanical structures, within the scope of my claims, without departing from the principles of the invention.

Figure 1 is a top plan view of a two-wheel implement embodying my invention, and equipped with a suitable motor for operating the rotary beater.

Figure 2 is a longitudinal vertical sectional view as at line 2—2 of Fig. 1.

Figure 3 is an enlarged detail vertical sectional view transversely of the implement showing one of the journal bearings for the rotary beater.

Figure 4 is a fragmentary view partly in section showing the mechanical means for vertically adjusting the beater.

Figure 5:
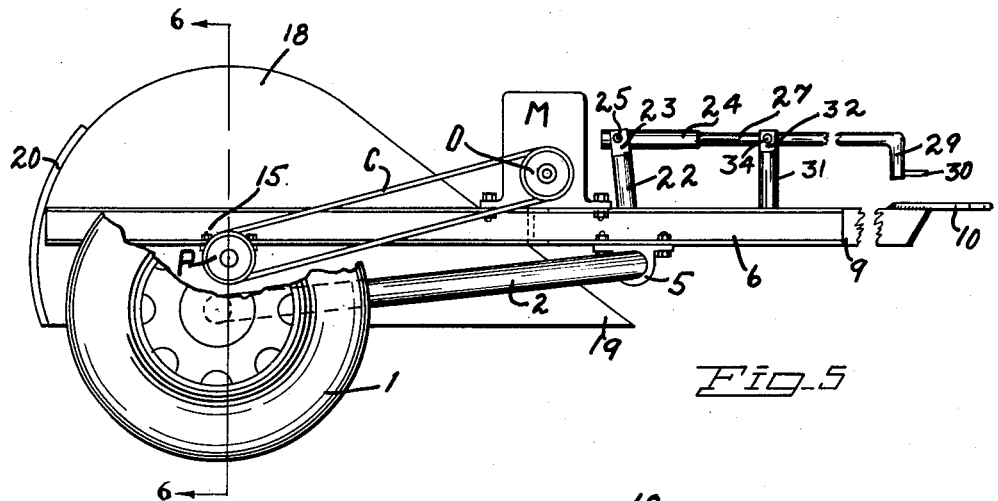
Figure 5 is a view in side elevation showing especially the drive mechanism for the beater.
Figure 6:
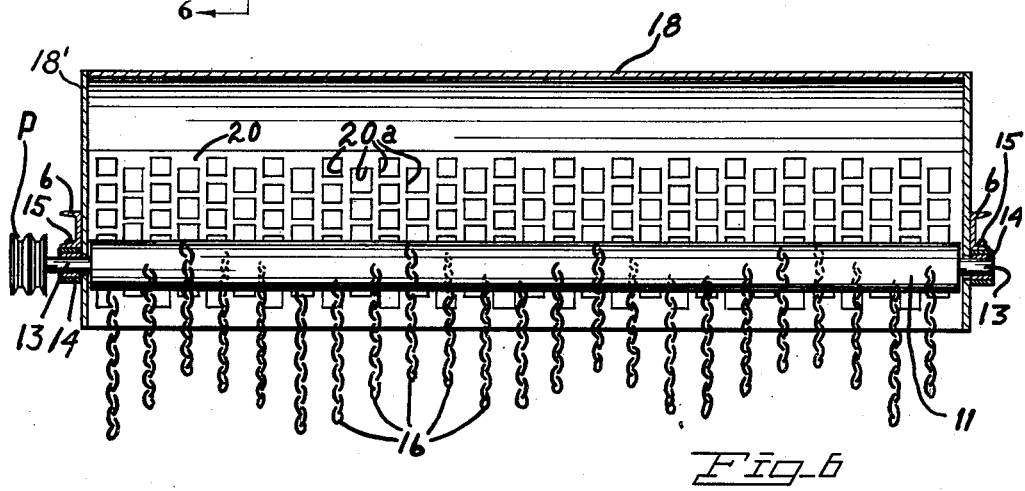
Figure 6 is a transverse vertical sectional view showing the hood enclosing the rotary beater.

The two laterally spaced and axially alined wheel 1, 1, of the implement support a somewhat U-shaped tubular frame that includes two side bars 2, 2, having stub axles 3 on which the wheels are journaled, and these side bars are united by a front cross bar 4 which is journaled in bearings 5, 5, that are bolted to the undersides of a pair of longitudinally extending, channel-shape side bars 6, 6, of the beater frame. These side bars of the beater frame are united at the front of the implement by a pair of longitudinally spaced channel bars 7, 7, and oblique braces 8, 8 unites the centrally located draft tongue 9 with the beater frame; a suitable hitching element for the draft tongue being indicated at 10 for attachment to the towing tractor.

The wheel frame and the beater frame are thus articulated for draft purposes, and in order that the beater frame may be vertically adjusted to variable operating positions with relation to the ground, and in order that the rotary beater may be elevated to inoperative position for transportation and other purposes.

As here indicated the rotary beater includes a transversely arranged tubular rotor, drum, or metal pipe 11 in the opposite ends of which are mounted and welded in place two stub axles 12, 12 having journal pins 13 which are journaled in bearings 14 secured by bolts 15 to the under faces of the frame bars 6. Multiple chains 16 are secured to the rotor by U-shape loops 17 which may be half-links of the chains that are welded to the exterior face of the drums, and these chains, that are staggered in their arrangement in order to cover a comparatively wide swath in the field, are flexibly suspended to dangle freely from the rotor.

The rotary beater is operated or driven by means of a suitable motor indicated as M and mounted upon the beater frame in convenient position, and a belt drive C is indicated from the drive pulley D of the motor to the driven pulley P on one of the journal pins 13 of the rotor.

The flexible beaters revolve with the drum at a height so that they will beat down and break the standing stubble as the implement is drawn across the field, and the broken bits of stubble are prevented from scattering, and are spread upon the field by means of a hood rigidly mounted on the beater frame.

The hood includes a somewhat semi-cylindrical portion 18, and a forwardly extending cowl 19 having side walls 18' with openings for the journal bearing pins 13 and the hood is rigidly mounted, as by welding, in the beater frame, to enclose the revolving beater. As best seen in Fig. 2 the rotary beater is arranged within the hood to revolve counterclockwise in order that the chains may beat the stubble toward the front of the traveling implement, and some of the broken bits of stubble are carried by the chains upwardly through the cowl, then over the beater and to the rear of the hood, with the broken bits traveling through a gradually diminishing area that is substantially closed by the extended chains as they pass down from the hood. In this manner the broken bits of stubble that are picked up by the chains are carried through the cowl toward the hood and simultaneously gathered for ejection through the back wall of the hood and deposit on the ground at the rear of the hood.

For this purpose the rear wall of the hood is provided with an exterior plate 20 that is provided with openings or slots 20a of a size to permit passage of the bits of stubble that are forced therethrough by the swinging chains.

Manually operated means are provided for vertically adjusting the beater frame and beater, and as disclosed in Figs. 2 and 4 an upright lever arm 22 is welded or otherwise fixed at the center of the cross bar 4 between the bearings 5, 5, and the yoke-end 23 of this arm has mounted therein a horizontal sleeve 24 having axially alined exterior trunnions 25 journaled in the arms of the yoke 23. Within the sleeve a fixed stop or block 26 is mounted to limit the movement of a longitudinally adjustable bar 27 that is threaded at 28, and at its front end terminates in a crank 29 and handle 30. The adjusting bar is supported by a post 31 fixed on the tongue 9, and the post has an upper yoke 32 in which a threaded nut 33 is swiveled by pins or trunnions 34. By turning the crank handle 29—30 the beater and beater frame are permitted by gravity to depress the cross bar 4 of the wheel frame and thus lower the beater and its frame, or by turning in the opposite direction, the threaded bar 27 pushes against the stop block 26 to elevate the beater, the hood, and the beater frame.

Having thus fully described my invention, what I claim as new and desire to secure by Letters Patent is:

1. In a wheeled implement for pulverizing standing stubble, the combination with a beater frame, a rotary flexible chain beater journaled in the frame, and means for operating the beater operatively associated therewith, a hood mounted on the beater frame and over the beater, said hood having a rear elevated and slotted plate to permit depositing collected bits of stubble upon the ground and a forwardly projecting cowl to provide a diminishing area for collecting the stubble.

2. In a wheeled implement for pulverizing standing stubble, the combination with a beater-frame, an open bottom hood having a rear semi-cylindrical portion and lateral walls and rigidly mounted on the frame, said hood terminating in a forwardly projecting flat-top cowl to provide a diminishing area for collecting the stubble, and said rear portion having an upright plate slotted to permit exit of collected bits of stubble, of a transversely arranged rotary chain-beater journaled within the hood and between its lateral walls, and exterior power operated means for rotating the chain-beater.

JOHN W. ROACH.

REFERENCES CITED

The following references are of record in the file of this patent:

UNITED STATES PATENTS

| Number | Name | Date |
|---|---|---|
| 1,128,916 | Thayer | Feb. 16, 1915 |
| 1,368,355 | Rutishauser | Feb. 15, 1921 |
| 1,505,572 | McDonald | Aug. 19, 1924 |
| 1,676,172 | Warner | July 3, 1928 |
| 1,698,724 | Johnston et al. | Jan. 15, 1929 |
| 2,347,664 | Chilton | May 2, 1944 |